(12) United States Patent
Gallagher et al.

(10) Patent No.: US 7,336,819 B2
(45) Date of Patent: Feb. 26, 2008

(54) DETECTION OF SKY IN DIGITAL COLOR IMAGES

(75) Inventors: Andrew C. Gallagher, Brockport, NY (US); Jiebo Luo, Pittsford, NY (US); Wei Hao, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 821 days.

(21) Appl. No.: 10/747,597

(22) Filed: Dec. 29, 2003

(65) Prior Publication Data

US 2005/0147298 A1    Jul. 7, 2005

(51) Int. Cl.
*G06K 9/00* (2006.01)

(52) U.S. Cl. .............. 382/165; 348/625; 382/162; 382/224; 382/225; 358/515

(58) Field of Classification Search ........ 382/163, 382/164, 165, 166, 173, 180, 224, 225, 226, 382/227, 228, 162
See application file for complete search history.

(56) References Cited

U.S. PATENT DOCUMENTS

| | | | | |
|---|---|---|---|---|
| 5,093,869 A * | 3/1992 | Alves et al. | ............... | 382/199 |
| 5,642,443 A | 6/1997 | Goodwin et al. | | |
| 5,889,578 A | 3/1999 | Jamzadeh | | |
| 5,901,245 A * | 5/1999 | Warnick et al. | ............ | 382/190 |
| 6,504,951 B1 * | 1/2003 | Luo et al. | ................... | 382/165 |
| 6,505,951 B1 | 1/2003 | Lorenzo, Jr. et al. | | |
| 6,512,846 B1 * | 1/2003 | Luo | ............................ | 382/165 |
| 6,947,590 B2 * | 9/2005 | Magarey et al. | ............ | 382/164 |
| 7,194,134 B2 * | 3/2007 | Bradshaw | .................... | 382/226 |
| 2002/0140864 A1 * | 10/2002 | Herman et al. | ............ | 348/625 |
| 2003/0179931 A1 * | 9/2003 | Sun | ............................ | 382/190 |

FOREIGN PATENT DOCUMENTS

EP        1 318 475        6/2003

OTHER PUBLICATIONS

Saber et al, Automatic Image Annotation Using Adaptive Color Classification, Graphical Models and Image Processing, vol. 58, No. 2, Mar. 1996, pp. 115-126.
Summer et al, Indoor-Outdoor Image Classification, IEEE Intl. Workshop on Content-based Acess of Image and Video Database, 1998 pp. 1-9.
Smith et al, Decoding Image Semantics Using Composite Region Templates, Proc. IEEE Intl. Workshop on Content-based Access of Image and Vidoe Database, 1998, pp. 1-5.
Vailaya et al, On Image Classification: City Images vs. Landscapes, Proc. IEEE Intl Workshop on Content-based Access of Image and Video Database, 1998, pp. 1-23.

(Continued)

*Primary Examiner*—Samir Ahmed
*Assistant Examiner*—Michael A Newman
(74) *Attorney, Agent, or Firm*—Raymond L. Owens

(57) ABSTRACT

A method of detecting sky in a digital color image having pixels is disclosed. The method includes identifying pixels from the digital color image representing an initial sky region; developing a model based on the identified sky pixels, wherein such model is a mathematical function that has inputs of pixel position and outputs of color; and using the model to operate on the digital color image to classify additional pixels not included in the initial sky region as sky.

5 Claims, 5 Drawing Sheets

OTHER PUBLICATIONS

"Improved blue sky detectioni using polynomial model fit" by Andrew Gallagher et al., 2004 International Conference on Image Processing (ICIP), pp. 2367-2370, XP010785262, ISBN: 0-7803-8554-3.

"A generic fuzzy rule based image segmentation algorithm" by Gour C. Karmakar, et al., Pattern Recognition Letters 23 (2002) 1215-1227, Aug. 2002, XP004349768, ISSN: 0167-8655.

* cited by examiner

DETECTION OF SKY IN DIGITAL COLOR IMAGES

FIELD OF INVENTION

The present invention relates to digital image processing in general, and to detecting sky in images in particular.

BACKGROUND OF THE INVENTION

Sky is among the most important subject matters frequently seen in photographic images. In a digital color image, a pixel or region represents sky if it corresponds to a sky region in the original scene. In essence, a pixel or region represents sky if it is an image of the earth's atmosphere. Detection of sky can often facilitate a variety of image understanding, enhancement, and manipulation tasks. Sky is a strong indicator of an outdoor image for scene categorization (e.g., outdoor scenes vs. indoor scenes, picnic scenes vs. meeting scenes, city vs. landscape, etc.). See, for example M. Szummer and R. W. Picard, "Indoor-Outdoor Image Classification," in *Proc. IEEE Intl. Workshop on Content-based Access of Image and Video Database,* 1998 and A. Vailaya, A. Jain, and H. J. Zhang, "On hnage Classification: City vs. Landscape," in *Proc. IEEE Intl. Workshop on Content-based Access of Image and Video Database,* 1998 (both of which are incorporated herein by reference). With information about the sky, it is possible to formulate queries such as "outdoor images that contain significant sky" or "sunset images" etc. (e.g., see J. R. Smith and C.-S. Li, "Decoding Image Semantics Using Composite Region Templates," in *Proc. IEEE Intl. Workshop on Content-based Access of Image and Video Database,* 1998, incorporated herein by reference). Thus, sky detection can also lead to more effective content-based image retrieval.

For recognizing the orientation of an image, knowledge of sky and its orientation may indicate the image orientation for outdoor images (contrary to the common belief, a sky region is not always at the top of an image). Further, in detecting main subjects in the image, sky regions can usually be excluded because they are likely to be part of the background.

The most prominent characteristic of sky is its color, which is usually light blue when the sky is clear. Such a characteristic has been used to detect sky in images. For example, U.S. Pat. No. 5,889,578, entitled "Method and Apparatus for Using Film Scanning Information to Determine the Type and Category of an Image" by F. S. Jamzadeh, mentions the use of color cue ("light blue") to detect sky without providing further description.

Commonly assigned U.S. Pat. No. 5,642,443, entitled, "Whole Order Orientation Method and Apparatus" by Robert M. Goodwin, (which is incorporated herein by reference) uses color and (lack of) texture to indicate pixels associated with sky in the image. In particular, partitioning by chromaticity domain into sectors is utilized by Goodwin. Pixels with sampling zones along the two long sides of a non-oriented image are examined. If an asymmetric distribution of sky colors is found, the orientation of the image is estimated. The orientation of a whole order of photos is determined based on estimates for individual images in the order. For the whole order orientation method in Goodwin to be successful, a sufficiently large group of characteristics (so that one with at least an 80% success rate is found in nearly every image), or a smaller group of characteristics (with greater than a 90% success rate, which characteristics can be found in about 40% of all images) is needed. Therefore, with Goodwin, a very robust sky detection method is not required.

In a work by Saber et al. (E. Saber, A. M. Tekalp, R. Eschbach, and K. Knox, "Automatic Image Annotation Using Adaptive Color Classification", CVGIP: *Graphical Models and Image Processing,* vol. 58, pp. 115-126, 1996, incorporated herein by reference), color classification was used to detect sky. The sky pixels are assumed to follow a 2D Gaussian probability density function (PDF). Therefore, a metric similar to the Mahalonobis distance is used, along with an adaptively determined threshold for a given image, to determine sky pixels. Finally, information regarding the presence of sky, grass, and skin, which are extracted from the image based solely on the above-mentioned color classification, are used to determine the categorization and annotation of an image (e.g., "outdoor", "people").

Recognizing that matching natural images solely based on global similarities can only take things so far. Therefore, Smith, supra, developed a method for decoding image semantics using composite regions templates (CRT) in the context of content-based image retrieval. With the process in Smith, after an image is partitioned using color region segmentation, vertical and horizontal scans are performed on a typical 5×5 grid to create the CRT, which is essentially a 5×5 matrix showing the spatial relationship among regions. Assuming known image orientation, a blue extended patch at the top of an image is likely to represent clear sky, and the regions corresponding to skies and clouds are likely to be above the regions corresponding to grass and trees. Although these assumptions are not always valid, nevertheless it was shown in Smith, supra, that queries performed using CRTs, color histograms and texture were much more effective for such categories as "sunsets" and "nature".

In commonly assigned U.S. Pat. No. 6,504,951, Luo and Etz show that blue sky appears to be desaturated near the horizon, causing a gradual gradient across a sky region. Sky is identified by examining such gradient signal of candidate sky region. The classification of sky is given to regions exhibiting an acceptable gradient signal. While the method described provides excellent performance, especially in eliminating other objects with similar colors to blue sky, the algorithm may fail to detect small regions of sky (e.g. a small region of sky visible between tree branches) because the small region is not large enough to exhibit the proper gradient signal.

SUMMARY OF THE INVENTION

It is an object of the present invention to provide improved ways of detecting sky in digital images.

This object is achieved by a method of detecting sky in a digital color image having pixels, the method comprising:

a) identifying pixels from the digital color image representing an initial sky region;

b) developing a model based on the identified sky pixels, wherein such model is a mathematical function that has inputs of pixel position and outputs of color; and c) using the model to operate on the digital color image to classify additional pixels not included in the initial sky region as sky.

It is an advantage of the present invention that more regions and pixels can be correctly identified as representing sky than was possible with heretofore known methods.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
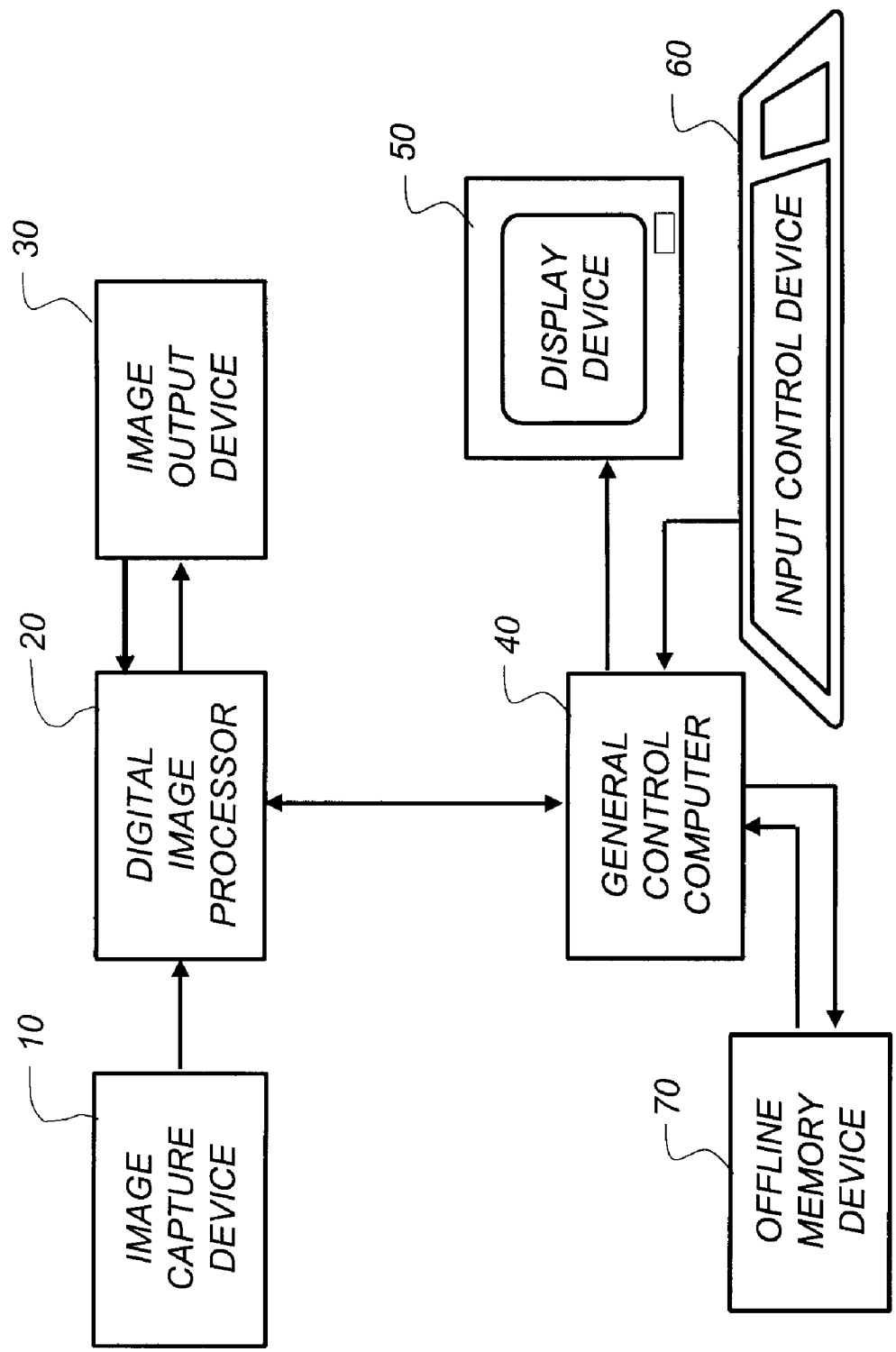
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple image capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but are not limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices which are physically connected and/or located within the same physical location. One or more of the devices illustrated in FIG. 1 may be located remotely and may be connected via a wireless connection.

A digital image includes one or more digital image channels. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2:
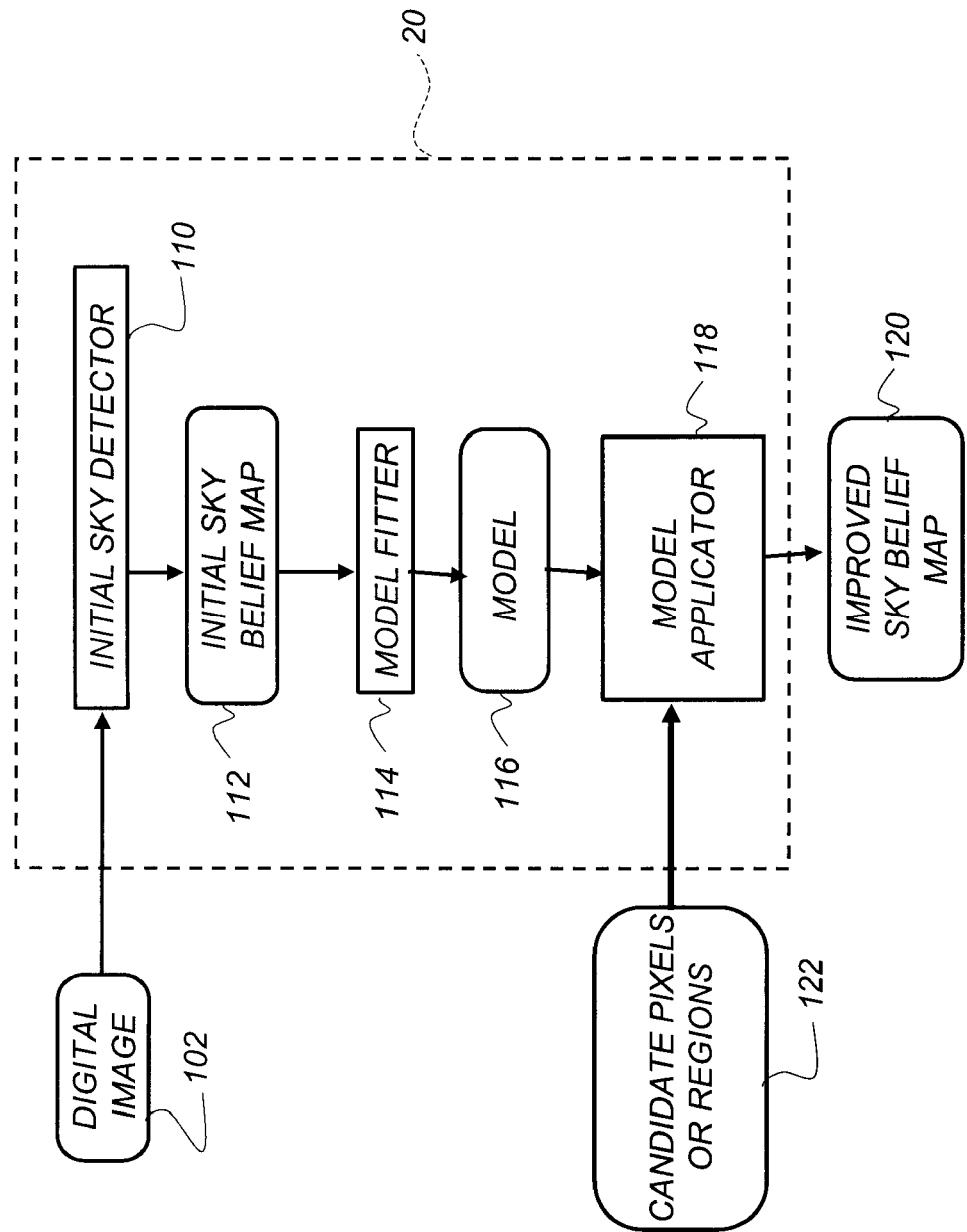
FIG. 2 is a block diagram of the digital image processor of FIG. 1 according to the present invention.

The digital image processor 20 shown in FIG. 1 and programmed to perform the method of the present invention is illustrated in more detail in FIG. 2. An original digital image 102 can be received from the image capture device 10 (shown in FIG. 1) in a variety of different color representations. However, the most typical implementation of the present invention receives the original digital image as a color digital image with red, green, and blue digital image channels. Preferably, the pixel values of the original digital image are related to the log of the scene intensity and each pixel value of each color channel is represented as a 12-bit value 0 to 4095. Preferably, every 188 code values represents a doubling of scene intensity (i.e. a photographic stop). For example, a first pixel having a value of 1688 represents a scene intensity that is twice as great as a second pixel having a value of 1500. The present invention can operate successfully with other encodings, including 8-bits RGB, although modification to equation constants and shapes of functions may be required.

The digital image 102 is input to an initial sky detector 110 to output an initial sky belief map 112. The initial sky belief map 112 indicates regions or pixels of the digital image 102 determined to have a non-zero belief that the regions or pixels represent blue sky. A region is a group of spatially connected pixels in a digital image, generally with a common characteristic (for example, similar pixel value). Preferably, the initial sky belief map 112 is an image having the same number of rows and columns of pixels as the digital image 102. The pixel value of a pixel from the initial sky belief map 112 indicates the belief or probability that the pixel represents blue sky. For example, a pixel value of 255 represents a 100% belief that the pixel is blue sky, a pixel value of 128 represents a 50% belief, and a 0 represents high belief that the pixel is NOT sky. Preferably, the initial sky detector 110 uses the method described by Luo and Etz in U.S. Pat. No. 6,504,951 the disclosure of which is incorporated by reference herein to produce the initial sky belief map. Briefly summarized, the method of producing the initial sky belief map includes extracting connected components of the potential sky pixels; eliminating ones of the connected components that have a texture above a predetermined texture threshold; computing desaturation gradients of the connected components; and comparing the desaturation gradients of the connected components with a predetermined desaturation gradient for sky to identify true sky regions in the image. The method of Luo and Etz is advantageous because of its low false positive detection rate, which is essential for preventing the subsequent steps from including other objects having similar colors.

The initial sky belief map 112 need not be represented as an image. For example, the initial sky belief map 112 can be a list of pixels or regions corresponding to locations in the digital image 102 and associated belief values.

The initial sky belief map 112 is passed to a model fitter 114 for fitting a model 116 to the pixel colors of at least one region having non-zero belief in the initial sky belief map 112. Preferably the model 116 is fitted to the color values of pixels from the region. The preferred model 116 is a two-dimensional second order polynomial of the form:

$$R'(x,y) = r_0 x^2 + r_1 xy + r_2 y^2 + r_3 x + r_4 y + r_5 \quad (1)$$

$$G'(x,y) = g_0 x^2 + g_1 xy + g_2 y^2 + g_3 x + g_4 y + g_5 \quad (2)$$

$$B'(x,y) = b_0 x^2 + b_1 xy + b_2 y^2 + b_3 x + b_4 y + b_5 \quad (3)$$

In matrix notation:

$$[R'(x,y) \ G'(x,y) \ B'(x,y)] = \quad (4)$$

$$[x^2 \ xy \ y^2 \ x \ y \ 1] \begin{bmatrix} r_0 & g_0 & b_0 \\ r_1 & g_1 & b_1 \\ r_2 & g_2 & b_2 \\ r_3 & g_3 & b_3 \\ r_4 & g_4 & b_4 \\ r_5 & g_5 & b_5 \end{bmatrix}$$

Cloudless sky generally changes slowly in color throughout an image and can be well modeled with the second order polynomial.

The dependent variables (i.e. inputs) of the model 116 are pixel positions x and y. The model coefficients are $r_0 \ldots r_5$, $g_0 \ldots g_5$, and $b_0 \ldots b_5$. The output of the model 116 is the estimated pixel color value [R'(x,y), G'(x,y), B'(x,y)] of a pixel at position (x,y). The coefficients are preferably determined such that the mean squared error between the actual pixel values and the estimated pixel color value is minimized. Such least—squares polynomial fitting techniques are well known in the art. A preferred method involves forming the Vandermonde matrix from N pixels selected from the at least one region having non-zero belief in the initial sky belief map 112. If the initial map has multiple non-zero belief regions, then the largest or highest-belief region may be selected as the region for constructing the model 116. For a second order polynomial, the Vandermonde matrix has N rows and 6 columns where each row corresponds to the position coordinates of one of the selected pixels:

$$V = \begin{bmatrix} x_0^2 & x_0 y_0 & y_0^2 & x_0 & y_0 & 1 \\ x_1^2 & x_1 y_1 & y_1^2 & x_1 & y_1 & 1 \\ \vdots & \vdots & \vdots & \vdots & \vdots & 1 \\ x_{N-1}^2 & x_{N-1} y_{N-1} & y_{N-1}^2 & x_{N-1} & y_{N-1} & 1 \end{bmatrix} \quad (5)$$

Additionally, for each color, an array A is defined of the actual pixel values from the digital image at the corresponding location:

$$A = \begin{bmatrix} C(x_0, y_0) \\ C(x_1, y_1) \\ \vdots \\ C(x_{N-1}, y_{N-1}) \end{bmatrix} \quad (6)$$

Where C(x,y) represents the value of a particular channel of the digital image 102 at position (x,y). Then, the least squares solution for the coefficients for channel C can be shown to be:

$$[c_0 c_1 c_2 c_3 c_4 c_5]^T = (V^T V)^{-1} V^T A \quad (7)$$

The model error for each color channel can also be determined by computing the square root of the mean squared difference between the array A and the array $V[c_0 \ c_1 \ c_2 \ c_3 \ c_4 \ c_5]^T$ (the estimate of pixel color for a particular channel). The model error relates to the "goodness of fit" of the model to the known non-zero belief region.

In summary, the model 116 has inputs of pixel position and outputs an estimate of color (the model expectation). The model 116 (equations and coefficients) is input to the model applicator 118 along with candidate pixels or regions 122 extracted from the digital image 102. Segmentation is used to generate the candidate sky regions 122. Segmentation is performed by well known techniques such as color clustering algorithm (e.g. the well known K-Means clustering algorithm.) Preferably, the candidate sky regions 122 are generated by using a neural network followed by connected component analysis as described in U.S. Pat. No. 6,504,951 such that these candidate sky regions have colors typical of blue sky. The model applicator 118 uses the model 116 to classify pixels as sky that were not originally classified as sky in the initial sky belief map 112. The model applicator 118 outputs an improved sky belief map 120 indicating pixels or regions of the digital image 102 that are believed to represent sky. The model applicator 118 can be applied repeatedly to different pixels or regions 122 from the digital image, until all pixels or regions (excluding pixels or regions originally corresponding with non-zero belief value in the initial sky belief map 112) have been considered by the model applicator 118.

Figure 3:
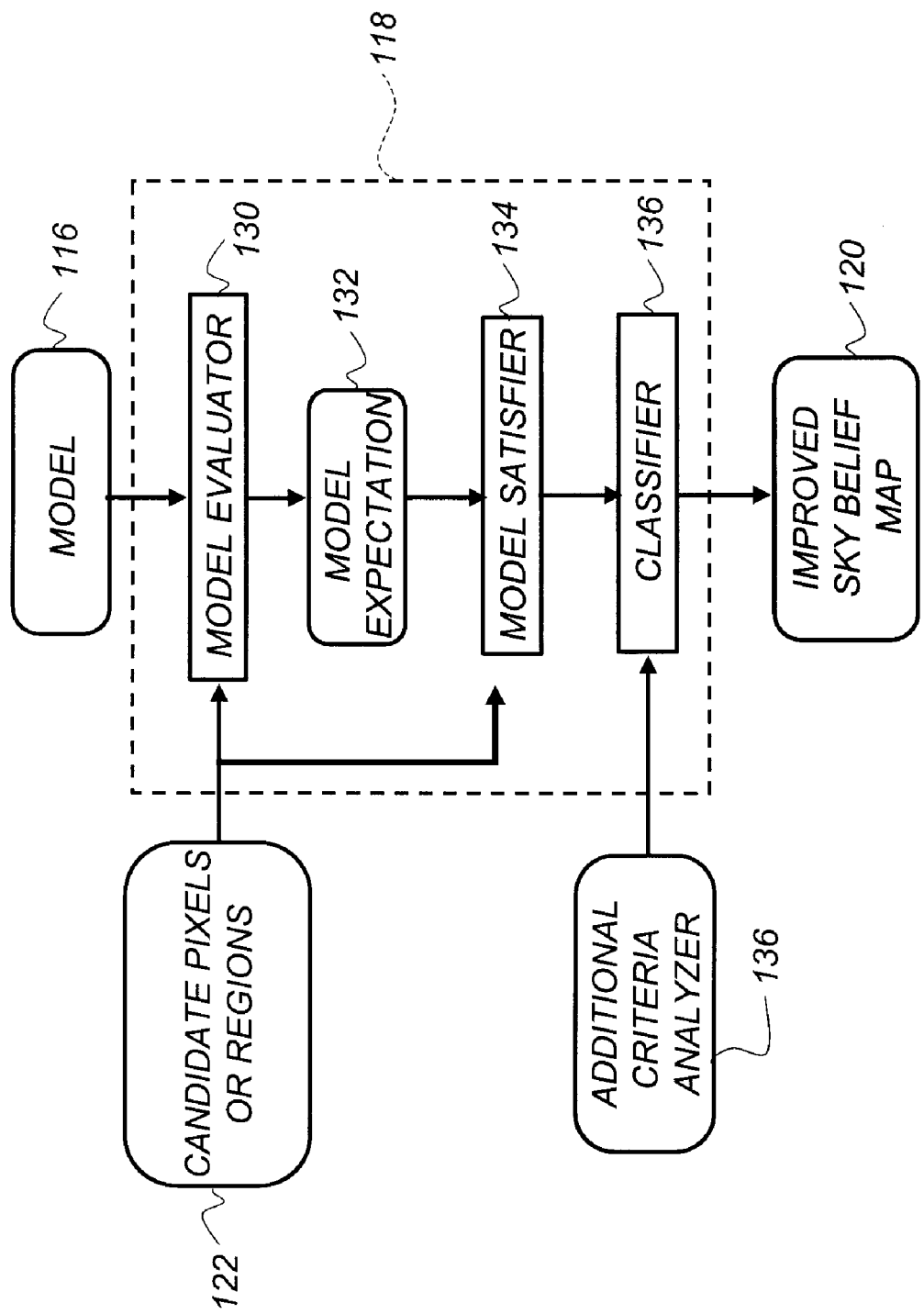
FIG. 3 is a block diagram of the model applicator of FIG. 2.

FIG. 3 shows a more detailed view of the model applicator 118. The model applicator 118 considers candidate sky regions or pixels 122 from the digital image 102 and determines if the color values of the candidate sky regions or pixels 122 are well explained by the model 116 and satisfy additional criteria. The model evaluator 130 evaluates the model 116 for all pixel positions of the candidate sky regions or pixels 122, creating a model expectation 132 of the color values for the candidate sky regions or pixels 122. A model satisfier 134 determines whether the color values of the candidate pixels or regions 122 of the digital image 102 are similar enough to the model explanation 132 and a classifier 136 considers the result of the model satisfier 134 and an additional criteria analyzer 138 and determines whether to classify the candidate sky regions or pixels 122 as "sky" or "not sky".

The model satisfier 134 considers the actual color values and the color values of the model expectation 132 of the candidate sky regions or pixels 122. A pixel is considered to satisfy the model when the corresponding color value of the model expectation is close to the actual color value of the pixel. Preferably, the model color estimate is considered to be close to the actual color when the difference between the model color estimate and the actual color value of the pixel for each color channel is less than $T_0$ times the model error for that color channel. Preferably $T_0=4$.

Additional criteria that is considered by the additional criteria analyzer 138 is the hue of the model's color estimate. The method of the present invention is primarily directed at detecting blue sky (although with modification it could be used to detect other smoothly varying sky signals, such as certain sunrise or sunset skies). In order for a pixel to satisfy the additional criteria, the model's color estimate must be blue or nearly blue (e.g. the ratio R'(x, y)/B'(x, y) must be less than $T_1$, where preferably $T_1=0.9$). Those skilled in the art will recognize that the additional criteria may include other features related to the color or structure of the candidate pixels or regions 122 or the model 116 itself. For example, because sky is smoothly varying, in the case where the candidate pixel or region 122 is a region, the additional criteria may specify a limit below which the standard deviation of the color values of the regions pixel's must fall in order to satisfy the additional criteria. Furthermore, the additional criteria that may be considered can include the size (e.g. number of pixels) of a candidate sky region 122. For example, in addition to the aforementioned requirements, satisfaction of the additional criteria may require that the region contain at least $T_2$ pixels. Preferably $T_2=20$. Still furthermore, satisfaction of the additional criteria may require that at least $T_3*100\%$ of the candidate sky region's pixels satisfy the model satisfier 134. Preferably $T_3=0.80$.

Finally, the classifier 136 considers the result of the model satisfier 134 and the additional criteria analyzer 138 and determines whether to classify the candidate sky regions or pixels 122 as "sky" or "not sky". When the candidate pixel or region 122 is a pixel, then the classifier 136 simply labels the pixel as "sky" when the additional criteria analyzer 138 indicates that the additional criteria is satisfied and the model satisfier 134 indicates that the model 116 is also satisfied.

When the candidate pixels or region 122 is a region of pixels, then the classifier 136 must consider multiple results from the model satisfier 134 and then classifies the region as "sky" or "not sky". Preferably, the classifier 136 classifies a region as "sky" when the additional criteria analyzer 138 indicates that all of the additional criteria are met.

The classifier 136 outputs an improved sky belief map 120. Preferably the improved sky belief map 120 is the same as the initial sky belief map 112 for pixels and regions having non-zero belief of representing sky in the initial sky belief map 112. The improved sky belief map 120 also indicates the pixels and regions judged by the classifier 136 as being "sky" with non-zero belief values equal to (alternatively a function of) the belief value of the non-zero belief region(s) of the initial sky belief map 112 that was (were) originally used to generate the model 116 by the model fitter 114 of FIG. 2. Regions or pixels classified as "not sky" are indicated with a belief value of 0 in the improved sky belief map 120.

Alternatively, the model satisfier 134 outputs a probability P that indicates a probability that the candidate pixel or region is sky. The probability is determined based on the aforementioned difference between the model color estimate and the actual color value of each pixel. As the difference increases, the probability decreases. For example, if the difference is 0 for all pixels in the region, then the model satisfier 134 outputs a probability P=100% that the region is sky. If the (Root Mean Square) average pixel difference is 3 times the model error, then the model satisfier 134 outputs a probability P=60%. The classifier 136 then classifies the pixel or region as "sky" or "not sky" based on the probability P from the model satisfier 134 and the information from the additional criteria analyzer 138. For example, the classifier 136 classifies regions as "sky" when the probability P is greater than 50% (assuming the additional criteria is met.) In this embodiment, a probability that a pixel or region represents sky is assigned based on the difference between the model color estimate and the actual color value of each pixel. Then the assigned probability is used to determine if the pixel or region is sky.

Figure 4:
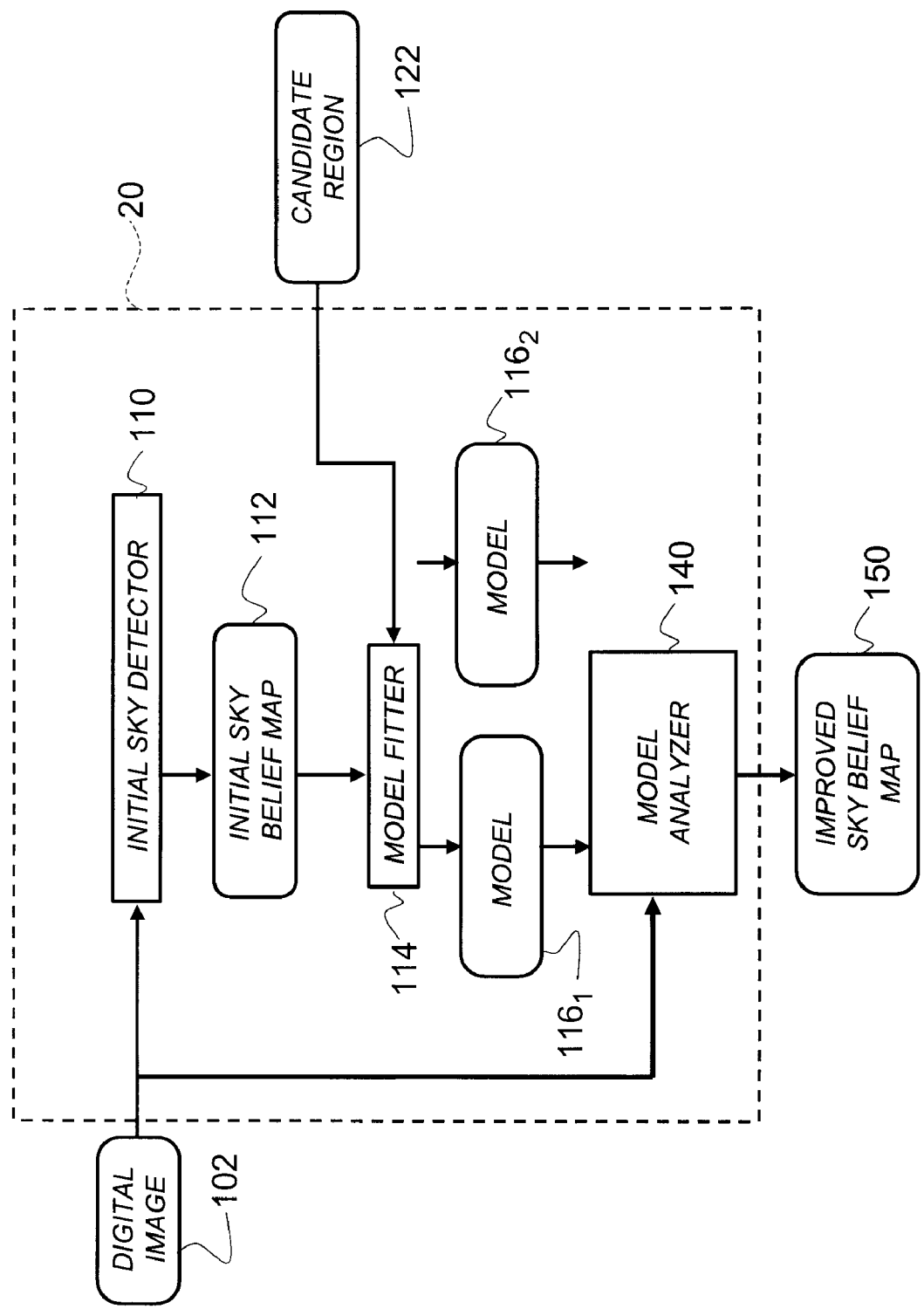
FIG. 4 is an alternative embodiment of the digital image processor of FIG. 2.

FIG. 4 shows an alternative view of the digital image processor 20. As previously described, the initial sky detector 110 outputs an initial sky belief map 112. The initial sky belief map 112 and a candidate sky region 122 is input to the model fitter 114. In this case the model fitter 114 constructs two models 116. A first model $116_1$ is the model relating to a non-zero belief region of the initial sky belief map 112, as previously described with respect to FIG. 2. A second model $116_2$ is generated using the same process of fitting a two dimensional second order polynomial to pixels of a non-zero belief region of the initial sky belief map and pixels from the candidate sky region 122. The models 116 are input to the model analyzer 140. The model analyzer 140 determines whether or not to classify the candidate sky region 122 as "sky" or "not sky" based on the first and second models. The candidate sky region is classified to be "sky" when the following conditions are met:

1. The model error for the pixels belonging to the non-zero belief region of the initial sky belief map 112 is not more than $T_4\%$ greater (preferably $T_4=50$) for the second model than for the first.
2. The model error for the candidate sky region with the second model is not more than $T_5\%$ (preferably $T_5=50$) the model fit error of the pixels belonging to the non-zero belief region of the initial sky belief map 112 with the first model.
3. The average color of the candidate sky region [$R_a$ $G_a$ $B_a$] is such that $R_a/B_a<T_5$ (preferably $T_5=0.9$).

The model analyzer 140 outputs an improved sky belief map 120. Preferably the improved sky belief map 120 is the same as the initial sky belief map 112 for pixels and regions having non-zero belief of representing sky in the initial sky belief map 112. The improved sky belief map 120 also indicates the pixels and regions judged by the classifier 136 as being "sky" with non-zero belief values equal to (alternatively a function of) the belief value of the non-zero belief region(s) of the initial sky belief map 112 that was (were) originally used to generate the model 116 by the model fitter 114 of FIG. 2. Regions or pixels classified as "not sky" are indicated with a belief value of 0 in the improved sky belief map 120.

Figure 5B:
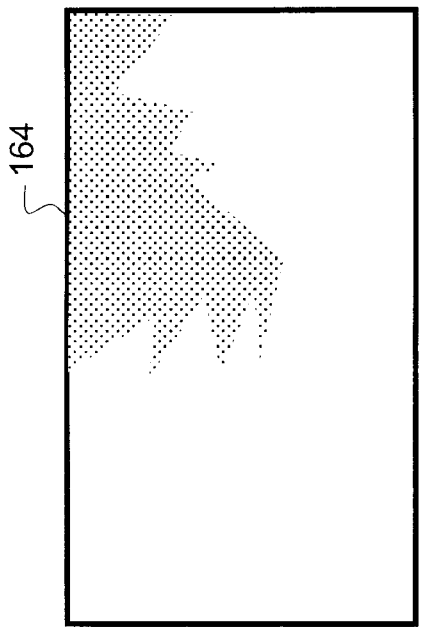
FIGS. 5A-C show example images that illustrate the effect of the present method.
Figure 5C:
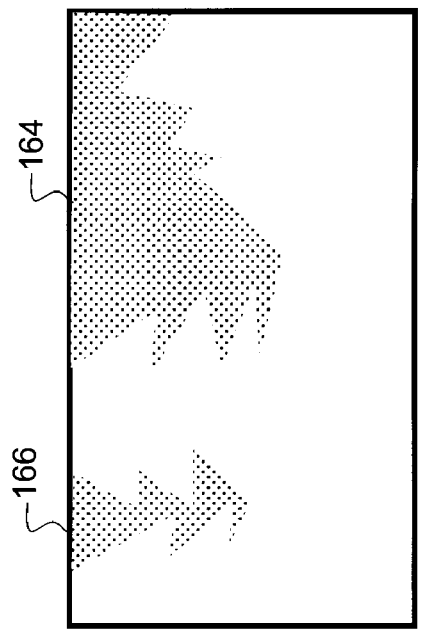
Figure 5A:
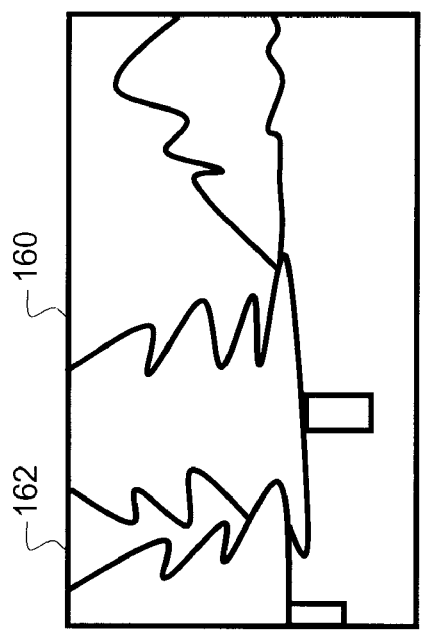

FIGS. 5A-C show images that illustrate the effect of the present invention. FIG. 5A shows a drawing representing an original image with sky. Trees spatially break of the sky on the image into two sky regions, a smaller region 162 and a larger region 160. FIG. 5B shows a representation of an initial sky belief map 112. A dark region 164 indicates a region having non-zero belief that initially identifies a sky region. However, sky region 162 of FIG. 5A was not correctly identified as sky because it is not big enough to exhibit the gradient signal typical of blue sky. FIG. 5C shows a representation of the improved, sky belief map 120 where dark regions 166 and 164 correctly identify the two sky regions 160 and 162 of the original image shown in FIG. 5A.

The method of the present invention can be performed in a digital camera, a digital printer, or on a personal computer.

The invention has been described in detail with particular reference to certain preferred embodiments thereof, but it will be understood that variations and modifications can be effected within the spirit and scope of the invention.

PARTS LIST 10 image capture device
20 digital image processor
30 image output device
40 general control computer
50 display device
60 input control device
70 offline memory device
102 digital image
110 initial sky detector
112 initial sky belief map
114 model fitter
116 model
$116_1$ model
$116_2$ model
118 model applicator
120 improved sky belief map
122 candidate pixel or region
130 model evaluator
132 model expectation
134 model satisfier
136 classifier
138 additional criteria analyzer
140 model analyzer
160 large sky region
162 small sky region
164 dark region
166 dark region

What is claimed is:

1. A method of detecting sky in a digital color image having pixels, the method comprising:
 a) identifying pixels having a range of colors from the digital color image and forming an initial sky region using the identified sky pixels;
 b) developing a model based on the identified sky pixels, wherein such model is a mathematical function that has inputs of pixel position and outputs of color;
 c) using the model to operate on the digital color image to classify additional pixels not included in the formed initial sky region as sky including;
  i) determining a difference between the color of a pixel and the model estimated color for the pixel's position;
  ii) using the determined difference at a plurality of pixel positions to calculate a residual error from the differences; and
  iii) using the difference to assign a probability that the pixel represents sky further, by computing a ratio of the difference with the residual error and using the ratio to assign the probability; and
 d) using the probability to determine if the pixel is in a sky region.

2. The method of claim 1 wherein the model is a two-dimensional polynomial of the pixel position in the digital color image.

3. The method of claim 2 wherein the polynomial is a second-order polynomial.

4. The method of claim 1 wherein the step of identifying an initial sky region further comprises:
 i) extracting connected components of said potential sky pixels;
 ii) eliminating ones of said connected components that have a texture above a predetermined texture threshold; and
 iii) computing desaturation gradients of said connected components; and comparing said desaturation gradients of said connected components with a predetermined desaturation gradient for sky to identify true sky regions in said digital color image.

5. The method of claim 1 wherein in computing the probability of the pixels as sky further comprises:
 computing a color feature, related to the "blueness" of the pixels in the region; and
 using the color feature to determine if the pixels are not sky.

* * * * *